(12) United States Patent
Telafici

(10) Patent No.: US 8,484,725 B1
(45) Date of Patent: Jul. 9, 2013

(54) SYSTEM, METHOD AND COMPUTER PROGRAM PRODUCT FOR UTILIZING A THREAT SCANNER FOR PERFORMING NON-THREAT-RELATED PROCESSING

(75) Inventor: Joseph V. Telafici, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1073 days.

(21) Appl. No.: 11/260,820

(22) Filed: Oct. 26, 2005

(51) Int. Cl.
*H04L 63/1416* (2006.01)
*G06F 9/4401* (2006.01)

(52) U.S. Cl.
USPC ................................. 726/22; 713/1

(58) Field of Classification Search
USPC ............... 726/4, 5, 11, 22–26; 713/187, 188, 713/189
See application file for complete search history.

(56) References Cited

U.S. PATENT DOCUMENTS

| | | | |
|---|---|---|---|
| 5,802,277 A * | 9/1998 | Cowland | 726/22 |
| 5,987,610 A | 11/1999 | Franczek et al. | |
| 6,073,142 A | 6/2000 | Geiger et al. | |
| 6,115,471 A * | 9/2000 | Oki et al. | 380/242 |
| 6,438,749 B1 * | 8/2002 | Chamberlain | 717/174 |
| 6,460,050 B1 | 10/2002 | Pace et al. | |
| 7,080,407 B1 * | 7/2006 | Zhao et al. | 726/24 |
| 7,096,501 B2 * | 8/2006 | Kouznetsov et al. | 726/24 |
| 7,437,764 B1 * | 10/2008 | Sobel et al. | 726/25 |
| 7,448,084 B1 * | 11/2008 | Apap et al. | 726/24 |
| 7,506,155 B1 | 3/2009 | Stewart et al. | |
| 7,747,561 B1 * | 6/2010 | Gupta et al. | 1/1 |
| 2003/0079145 A1 * | 4/2003 | Kouznetsov et al. | 713/200 |
| 2003/0126214 A1 * | 7/2003 | Oliszewski | 709/206 |
| 2003/0145228 A1 * | 7/2003 | Suuronen et al. | 713/201 |
| 2003/0233574 A1 * | 12/2003 | Kouznetsov et al. | 713/201 |
| 2004/0015712 A1 * | 1/2004 | Szor | 713/200 |
| 2004/0255161 A1 * | 12/2004 | Cavanaugh | 713/201 |
| 2005/0015760 A1 * | 1/2005 | Ivanov et al. | 717/168 |
| 2005/0044418 A1 * | 2/2005 | Miliefsky | 713/201 |
| 2005/0071851 A1 * | 3/2005 | Opheim | 719/321 |
| 2005/0097199 A1 * | 5/2005 | Woodard et al. | 709/223 |
| 2005/0216956 A1 * | 9/2005 | Orr et al. | 726/23 |
| 2005/0248457 A1 * | 11/2005 | Himberger et al. | 340/541 |
| 2005/0256664 A1 * | 11/2005 | Blumfield et al. | 702/121 |
| 2005/0262208 A1 * | 11/2005 | Haviv et al. | 709/206 |
| 2006/0195566 A1 * | 8/2006 | Hurley | 709/224 |
| 2006/0230288 A1 * | 10/2006 | Fox et al. | 713/188 |
| 2006/0230454 A1 * | 10/2006 | Achanta et al. | 726/24 |
| 2007/0016938 A1 * | 1/2007 | Lin | 726/3 |
| 2007/0028303 A1 * | 2/2007 | Brennan | 726/24 |
| 2007/0053352 A1 * | 3/2007 | Corcoran | 370/389 |
| 2007/0094654 A1 * | 4/2007 | Costea | 717/168 |
| 2008/0049949 A1 * | 2/2008 | Snider et al. | 381/86 |

OTHER PUBLICATIONS

"GFiLANguard, Network Security Scanner, Security Scanning & Patch Management", http://www.gfi.com/lannetscan/.

* cited by examiner

*Primary Examiner* — Eleni Shiferaw
*Assistant Examiner* — Abu Sholeman
(74) *Attorney, Agent, or Firm* — Patent Capital Group

(57) ABSTRACT

A threat scanning system, method and computer program product are provided. Initially, data is received or identified (e.g. by way of an update, initial installation, etc.). Such data may include first data for use in performing a first threat-related function, and second data for use in performing a second non-threat-related function. In use, the first threat-related function and the second non-threat-related function are both performed with a threat scanner, utilizing the first data and the second data.

13 Claims, 5 Drawing Sheets

US 8,484,725 B1

SYSTEM, METHOD AND COMPUTER PROGRAM PRODUCT FOR UTILIZING A THREAT SCANNER FOR PERFORMING NON-THREAT-RELATED PROCESSING

FIELD OF THE INVENTION

The present invention relates to threat scanners, and more particularly to scanning data for threats.

BACKGROUND

With the advent of general access computer networks, such as the Internet, people may now easily exchange application data between computer systems. Unfortunately, some people have taken advantage of such easy data exchange by developing various threats, such as viruses.

In response to such security threats, anti-threat programs have been developed to identify and remove threats. In use, such anti-threat programs check a computer system for known threats. Typically, programs called threat scanners are installed to scan files, sometimes according to user preferences, as the files are created and/or accessed.

To this end, such threat scanners may include various functionality including, but not limited to locating data, or code, with certain "signatures," or characteristics, associated with threats, and further making changes to the underlying binary data, so as to reverse any effects of the threat. Still yet, threat scanners may optionally make system changes to persistent data, like a registry, to reverse any changes caused by a threat. Thus, threat scanners are capable of highly-targeted computer code modification.

Unfortunately, to date, the foregoing capabilities of threat scanners have only been leveraged for dealing with threat-related issues.

SUMMARY

A threat scanning system, method and computer program product are provided. Initially, data is received or identified (e.g. by way of an update, initial installation, etc.). Such data may include first data for use in performing a first threat-related function, and second data for use in performing a second non-threat-related function. In use, the first threat-related function and the second non-threat-related function are both performed with a threat scanner, utilizing the first data and the second data.

DETAILED DESCRIPTION

Figure 1:
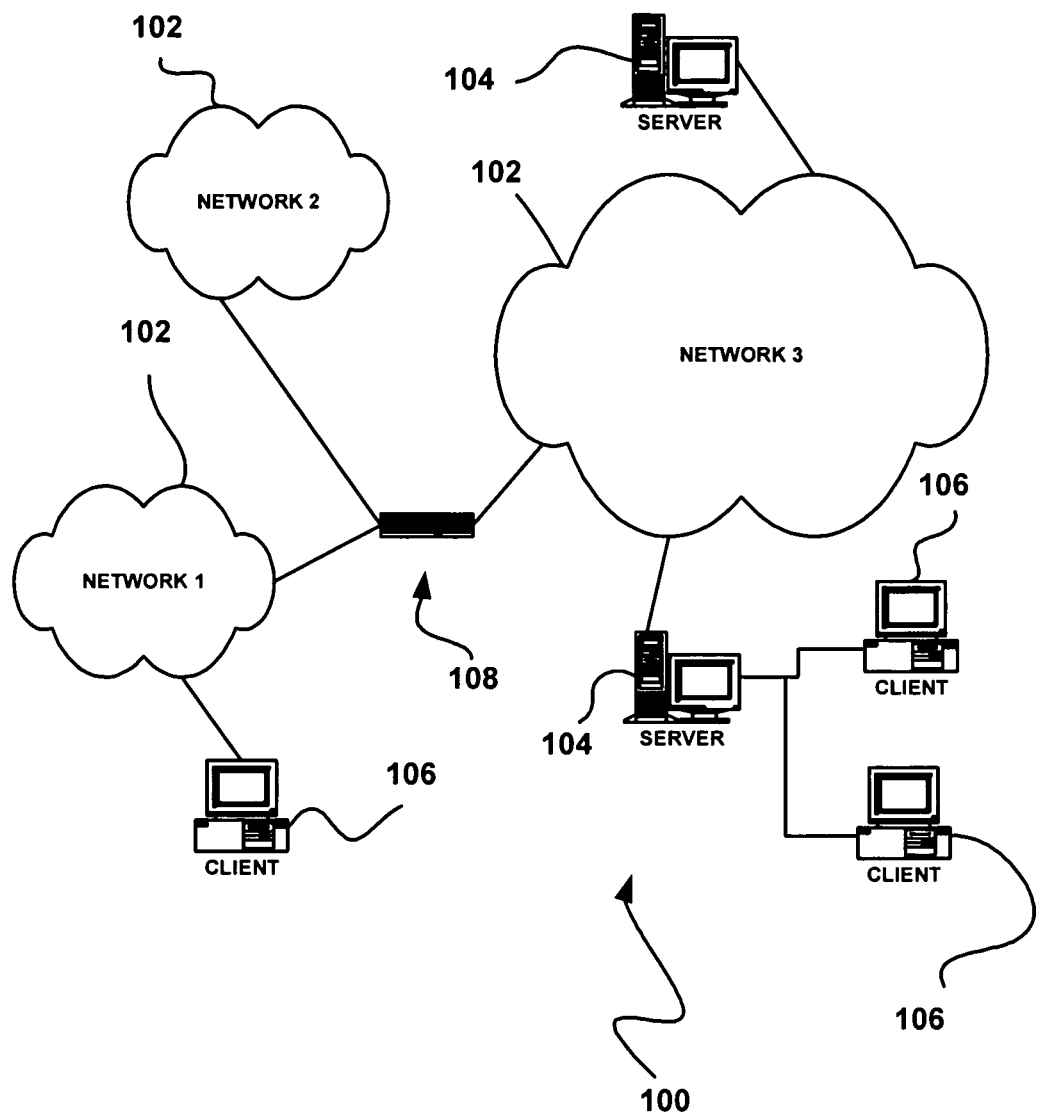
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing network devices in the present network architecture 100, as well as any other unillustrated hardware and/or software, may be equipped with a threat scanner. In use, the threat scanner is capable of utilizing both first data in performing a first threat-related function, and second data in performing a second non-threat-related function.

In the context of the present description, the threat scanner may refer to any hardware and/or software capable of scanning (e.g. identifying, searching, analyzing, examining, etc.) for threats. Further in the context of the present description, threats may refer to malware (e.g. viruses, etc.), intrusions, spyware, and/or any other harmful or undesired computing or networking entities. To this end, the first threat-related function may refer to any function associated with scanning for threats, and the second non-threat-related function may refer to any remaining functions. Still yet, the first data and second data may refer to any data capable of being used to perform the first threat-related function or second non-threat-related function, respectively.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
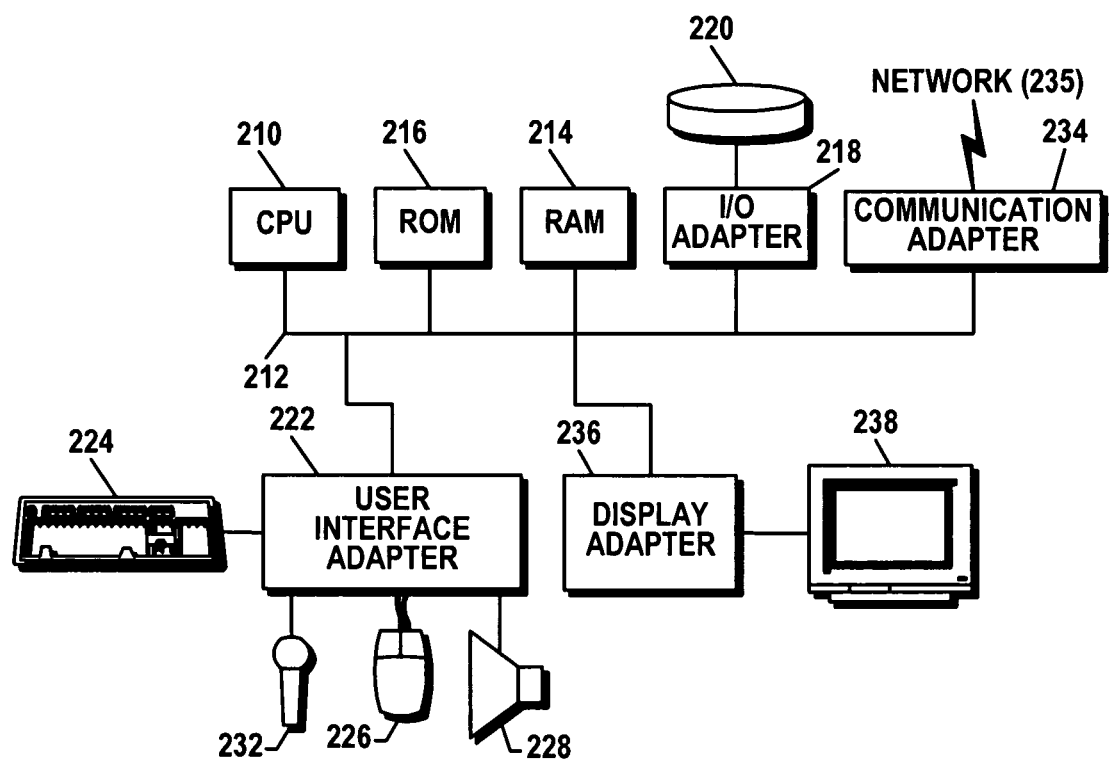
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
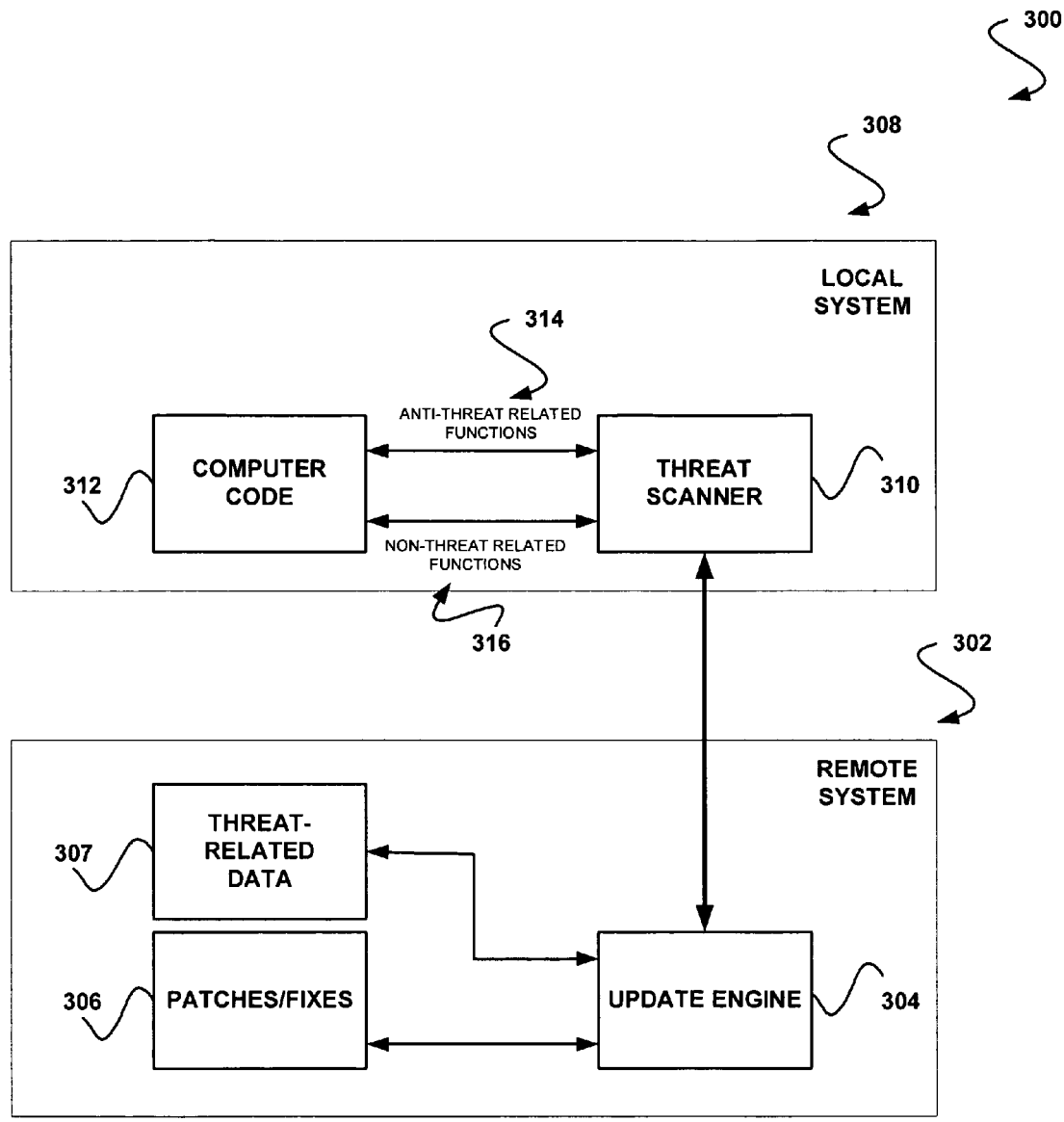
FIG. 3 shows an architecture for performing non-threat-related functions with a threat scanner, in accordance with one embodiment.

FIG. 3 shows an architecture 300 for performing non-threat-related functions with a threat scanner, in accordance with one embodiment. As an option, the present architecture 300 may be implemented in the context of the architecture and environment of FIGS. 1 and/or 2. Of course, however, the architecture 300 may be carried out in any desired environment.

As shown, the architecture 300 includes both a remote system 302 and a local system 308. In one embodiment, the local remote system 302 and local system 308 may include any desired computer (e.g. see, for example, the server computers 104 and/or client computers 106 of FIG. 1, etc.) that are in communication via a network (e.g. see, for example, the networks 102 of FIG. 1, etc.). As further shown, the remote system 302 includes first data for use in performing a first threat-related function in the form of threat-related data 307. As an option, such threat-related data 307 may include different files (e.g. DATs), each with a specific purpose relating to threat-related functionality.

For example, a first type of file may include detection data (e.g. virus signatures, etc.) for use in detecting a threat. Further, a second type of file may include reaction data (e.g. reaction process, cleaning or repair algorithms, etc.) for use in reacting to a detected threat. Still yet, a third type of file may include naming data (e.g. names or identifiers associated with certain virus signatures, etc.) for use in naming or identifying a detected threat.

Still yet, the remote system 302 includes second data for use in performing a second non-threat-related function in the form of patches and/or fixes 306. Similar to the first data, the patches and/or fixes 306 may include different types of files. Again, for example, a first type of file may include detection data (e.g. signatures indicative of computer code in need of an update or fix, etc.) for use in detecting non-threat-related computer code. Further, a second type of file may include reaction data (e.g. reaction process, updating algorithms, etc.) for use in reacting to a detected non-threat-related situation, and a third type of file may include naming data (e.g. names or identifiers associated with signatures, etc.) for use in naming or identifying detected computer code in need of an appropriate non-threat-related reaction.

While the threat-related data 307 and the patches/fixes 306 are shown to be separated, it should be noted that such data may, in various embodiments, be included in a single database residing on or coupled to the remote system 302. More exemplary information regarding various exemplary data structures associated with such data will be set forth in greater detail during reference to FIGS. 4A-4C.

Further included as a component of the remote system 302 is an update engine 304 capable of accessing the threat-related data 307 and the patches/fixes 306 for distributing the same to the local system 308 by way of a network.

With reference now to the local system 308, such system 308 includes a threat scanner 310 adapted for receiving the threat-related data 307 and the patches/fixes 306 via the update engine 304. It should be noted that such receipt may take the form of the data being pushed thereto, or even pulled, per the desires of the user. Further, such receipt may be prompted periodically on an automatic basis, per a manual instruction, as a function of a schedule, on a random basis, etc.

In use, the threat scanner 310 serves to access computer code 312 (e.g. computer data, executable instructions, or any other computer readable information, etc.) that resides on the local system 308. Of course, while not shown, the accessed computer code 312 may reside on a platform separate from that on which the threat scanner 310 resides.

To this end, the threat scanner 310 is capable of performing both threat-related functions 314 as well as non-threat-related functions 316. More exemplary information regarding such functionality will be set forth in greater detail during reference to FIG. 5.

Figure 4A:
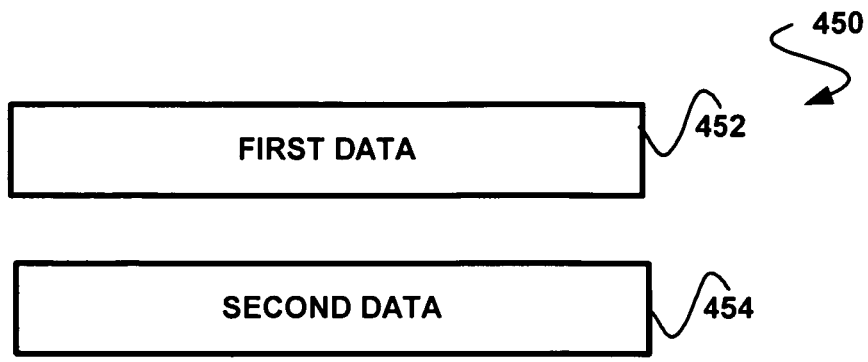
FIG. 4A shows a first data structure for separately containing first data for use in performing a first threat-related function, and second data for use in performing a second non-threat-related function, in accordance with one embodiment.
Figure 4B:
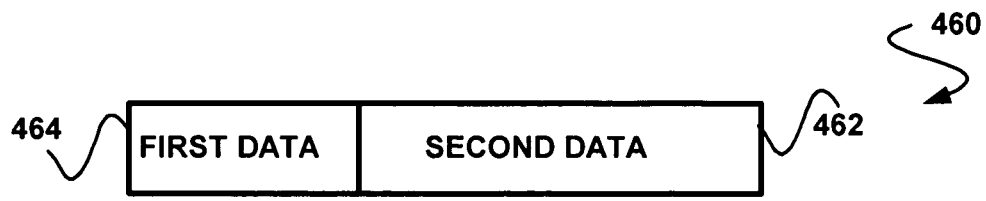
FIG. 4B shows a second data structure for containing both the first and second data together, in accordance with another embodiment.
Figure 4C:
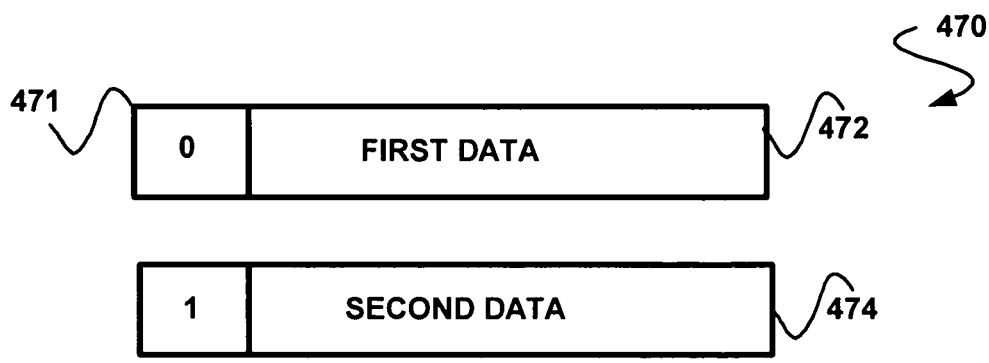
FIG. 4C shows a third data structure for separately containing the first data and the second data, in accordance with yet another embodiment.

FIGS. 4A-4C show various data structures for containing first data for use in performing a first threat-related function, and second data for use in performing a second non-threat-related function, in accordance with various embodiments. As an option, the various data structures may be implemented in the context of the architecture and environment of FIGS. 1-3. Of course, however, the various data structures may be carried out in any desired environment.

FIG. 4A shows a first data structure 450 for separately containing both first data 452 for use in performing a first threat-related function, and second data 454 for use in performing a second non-threat-related function, in accordance with one embodiment. As shown, the first data 452 and the second data 454 may be formatted identically. Further, each first data 452 and second data 454 may take the form of a separate file of a particular type, in the manner set forth previously.

Therefore, each file may therefore be dedicated for containing either the first data 452 or the second data 454. In the present embodiment, the first data 452 and second data 454 may be indistinguishable, except for the function (threat-related vs. non-threat-related, etc.) for which it is intended to be used.

FIG. 4B shows a second data structure 460 for containing both first data 462 and second data 464 in combination, in accordance with another embodiment. As shown, the data structure 460 may be reformatted (with respect to traditional virus signature files, etc.) to include at least one additional section. Thus, a dedicated section may be allocated for allowing containment of the second data 464 in conjunction with the first data 462. To this end, the first data 462 and second data 464 may be sent as a single file, and may be identified based on the appropriate section which is occupied.

FIG. 4C shows a third data structure 470 for separately containing first data 472 and second data 474, in accordance with yet another embodiment. As shown, the data structure 470 may be reformatted (with respect to traditional virus signature files, etc.) to include at least one additional tag 471. Of course, if available, an available tag in a traditional file may simply be allocated, without the foregoing re-formatting. In use, each file may include either the first data 472 or the second data 474, with the contents thereof being identified as threat-related or not utilizing the tag 471 (e.g. "0"=the first data 472 and "1"=the second data 474, etc.).

Figure 5:
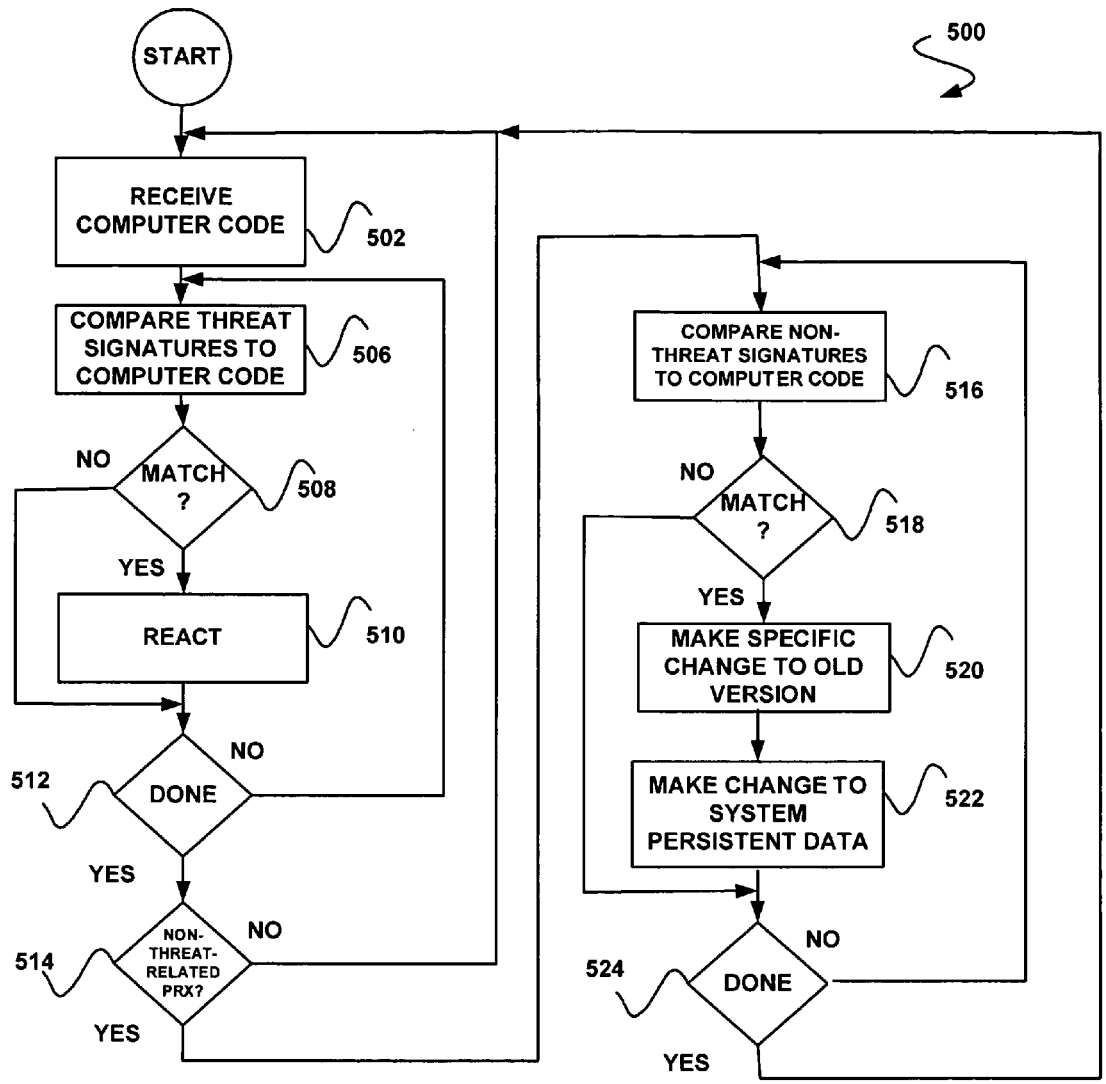
FIG. 5 shows a method for performing non-threat-related functions with a threat scanner, in accordance with one embodiment.

FIG. 5 shows a method 500 for performing non-threat-related functions with a threat scanner, in accordance with one embodiment. As an option, the present method 500 may be implemented in the context of the architecture and environment of FIGS. 1-3 and/or the data structures of FIGS. 4B-4C. Of course, however, the method 500 may be carried out in any desired environment.

As shown, computer code is received in operation 502. Such computer code may be received upon accessing the same, upon a manually-initiated scan, upon the computer code traversing a network node (e.g. gateway, mail server, etc.). In operation 506, threat-related signatures are compared against the computer code during the course of a scan. In one embodiment, such scan may be administered by a threat scanner.

In decision 508, it is determined whether at least one of the threat signatures matches the computer code, based on the comparison of operation 506. Still yet, in operation 510, the present method 500 reacts to a threat, if it is determined that at least one of the threat-related signatures matches the computer code per decision 508. In one embodiment, such reacting may involve reporting the threat. Of course, however, it should be noted that the reaction may include, but is not limited to quarantining, cleaning, deleting, etc. the computer code, and/or any other response that is appropriate.

The foregoing operations are repeated until at least substantially all threat-related signatures have been compared against the computer code and the appropriate reaction, if any, has been carried out. Note decision 512. As will soon become apparent, the exhaustion of the threat-related signature comparison may be desirable to ensure that subsequent non-threat-related functionality is not carried out on an infected file or invoked in an environment that exhibits undesired threat-related characteristics. Once, however, all of the threat-related processing is completed by the threat scanner, non-threat-related processing may ensue.

Specifically, in decision 514, it is determined whether non-threat-related processing is desired or appropriate. Such decision 514 may be carried out based on any desired criteria. For example, a user may manually disable non-threat-related processing using an option available via a graphical user interface, an administrator may disable non-threat-related processing to conserve processing resources, and/or non-threat-related processing may be automatically disabled as a result of the absence of issues associated with non-threat-related signatures available to the threat scanner. As an example of the last-mentioned criteria, it may be determined in decision 514 that non-threat-related processing is not appropriate if a related set of non-threat-related processing was already previously performed within a predetermined amount of time, and no updated non-threat-related data has since then been received.

In various embodiments where the functionality surrounding decision 514 is available, data structures such as those set forth in FIGS. 4B-4C may be employed, since such data structures provide for indicators to distinguish between threat-related signatures and others. For example, the non-threat-related data may simply be dismissed or utilized based on an associated tag, etc. Of course, it should be noted that decision 514 may be forgone in an embodiment utilizing a data structure such as that in FIG. 4A, as well.

If non-threat-related processing is to ensue per decision 514, the non-threat-related signatures are compared to the computer code. See operation 516. It should be noted that, in the context of the present description, such non-threat-related signature may include a hash, pattern, characteristic and/or any other identifier capable of identifying computer code that is to be subject to non-threat-related functionality. Next, it is determined whether at least one of the non-threat-related signatures matches the computer code, based on the comparison. See decision 518.

In one embodiment where a non-threat-related function includes an update function, the non-threat-related signature may search for a signature of an older version of computer code that is to be updated with a newer version of the computer code. In various other embodiments, the non-threat-related signature may be used to identify a flawed version of the computer code, a vulnerability associated with the computer code, software error, etc.

Next, if it is determined that at least one of the non-threat-related signatures matches the computer code per decision 518, a non-threat-related function may be performed, such as a specific change to the computer code that was subject to the match. See operation 520. While it is contemplated that the non-threat-related function involves a simple replacement of the undesired computer code, such function may, in various embodiments, include only a minimal amount of changes, data, etc. for ensuring that the subject computer code is the binary-equivalent to a desired new computer code. Such embodiment provides enhanced bandwidth and resource efficiencies.

Further, any necessary change may be made to persistent system data (e.g. registry files, etc.). See operation 522. For example, one possible change to such persistent system data may include a change of registry keys to update the version number thereof.

Similar to the threat-related processing, operations 516-522 may be carried out until all of the non-threat-related signatures are compared against the computer code. Note decision 524.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

receiving first data for use in performing a first threat-related function;

receiving second data separate from the first data for use in performing a second non-threat-related function;

performing the first threat-related function and the second non-threat-related function during scanning activities involving computer code provided in a computer configured for network communications, wherein the first threat-related function includes comparing threat signatures to determine whether at least one of the threat signatures matches the computer code, and wherein the second non-threat-related function includes evaluating a plurality of non-threat signatures to identify flawed code and one or more software errors; and reacting to a threat if it is determined that at least one of the threat signatures matches the computer code, wherein the reacting includes quarantining the computer code, wherein processing of the second non-threat-related function is suspended until processing of a plurality of threat-related functions are exhausted by a threat scanner of the computer, and wherein the processing of the second non-threat-related function is disabled if a related set of non-threat-related processing was previously performed within a predetermined amount of time, and wherein an option is provided via a graphical user interface to manually disable the second non-threat-related function, wherein the second data includes a first type of file including detection data used in detecting non-threat-related computer code, a second type of file including reaction data used in reacting to a detected non-threat-related situation, and a third type of file including naming data used in naming the non-threat-related computer code in need of a non-threat-related reaction.

2. The method of claim 1, wherein the first threat-related function includes a virus scanning function.

3. The method of claim 1, wherein the first threat-related function includes a spyware scanning function.

4. The method of claim 1, wherein the reacting includes reporting the threat.

5. The method of claim 1, wherein the second non-threat-related function includes an update function.

6. The method of claim 5, wherein the update function includes updating an older version of the computer code with a newer version of the computer code.

7. The method of claim 1, wherein the second non-threat-related function includes a change to persistent system data.

8. The method of claim 1, wherein a data structure includes a tag for identifying contents thereof as being the first data or the second data.

9. The method of claim 1, wherein a data structure includes a first section for containing the first data and a second section for containing the second data.

10. A computer program product embodied on a tangible non-transitory computer readable medium for performing operations, comprising:
   identifying first data for use in performing a first threat-related function, and second data separate from the first data for use in performing a second non-threat-related function;
   performing the first threat-related function and the second non-threat-related function during scanning activities involving computer code provided in a computer configured for network communications, wherein the first threat-related function includes comparing threat signatures to determine whether at least one of the threat signatures matches the computer code, and wherein the second non-threat-related function includes evaluating a plurality of non-threat signatures to identify flawed code and one or more software errors; and
   reacting to a threat if it is determined that at least one of the threat signatures matches the computer code, wherein the reacting includes quarantining the computer code, wherein processing of the second non-threat-related function is suspended until processing of a plurality of threat-related functions are exhausted by a threat scanner of the computer, and wherein the processing of the second non-threat-related function is disabled if a related set of non-threat-related processing was previously performed within a predetermined amount of time, and wherein an option is provided via a graphical user interface to manually disable the second non-threat-related function, wherein the second data includes a first type of file including detection data used in detecting non-threat-related computer code, a second type of file including reaction data used in reacting to a detected non-threat-related situation, and a third type of file including naming data used in naming the non-threat-related computer code in need of a non-threat-related reaction.

11. A computer, comprising:

a processor; and a threat scanner, wherein the computer is configured for:
   utilizing first data in performing a first threat-related function, and second data separate from the first data in performing a second non-threat-related function, wherein the first threat-related function and the second non-threat-related function are performed during scanning activities involving computer code provided in the computer configured for network communications, wherein the first threat-related function includes comparing threat signatures to determine whether at least one of the threat signatures matches the computer code, and wherein the second non-threat-related function includes evaluating a plurality of non-threat signatures to identify flawed code and one or more software errors; and
   reacting to a threat if it is determined that at least one of the threat signatures matches the computer code, wherein the reacting includes quarantining the computer code, wherein processing of the second non-threat-related function is suspended until processing of a plurality of threat-related functions are exhausted by a threat scanner of the computer, and wherein the processing of the second non-threat-related function is disabled if a related set of non-threat-related processing was previously performed within a predetermined amount of time, and wherein an option is provided via a graphical user interface to manually disable the second non-threat-related function, wherein the second data includes a first type of file including detection data used in detecting non-threat-related computer code, a second type of file including reaction data used in reacting to a detected non-threat-related situation, and a third type of file including naming data used in naming the non-threat-related computer code in need of a non-threat-related reaction.

12. The method of claim 1, wherein the second non-threat related function is disabled and enabled via a graphical user interface.

13. The method of claim 1, wherein the second data separate from the first data includes non-threat-related signatures.

* * * * *